(12) United States Patent
Lötjönen

(10) Patent No.: US 7,876,945 B2
(45) Date of Patent: Jan. 25, 2011

(54) METHOD FOR PROCESSING SLICE IMAGES (75) Inventor: Jyrki Lötjönen, Tampere (FI)

(73) Assignee: Valtion Teknillinen Tutkimuskeskus, Espoo (FI)

( * ) Notice: Subject to any disclaimer, the term of this patent is extended or adjusted under 35 U.S.C. 154(b) by 647 days.

(21) Appl. No.: 10/579,061

(22) PCT Filed: Nov. 12, 2004

(86) PCT No.: PCT/FI2004/050164
§ 371 (c)(1), (2), (4) Date: May 11, 2006

(87) PCT Pub. No.: WO2005/046473
PCT Pub. Date: May 26, 2005

(65) Prior Publication Data
US 2007/0088209 A1 Apr. 19, 2007

(30) Foreign Application Priority Data
Nov. 12, 2003 (FI) .................................. 20035205

(51) Int. Cl.
G06K 9/00 (2006.01)
A61B 5/00 (2006.01)
A61B 5/05 (2006.01)
A61B 6/00 (2006.01)

(52) U.S. Cl. ........................ 382/131; 382/128; 382/132; 128/922; 600/309; 600/407; 600/410; 600/436

(58) Field of Classification Search ....................... None
See application file for complete search history.

(56) References Cited

U.S. PATENT DOCUMENTS 6,266,453 B1* 7/2001 Hibbard et al. ............. 382/294
6,289,135 B1* 9/2001 Declerck et al. ............ 382/276
2003/0020714 A1 1/2003 Kaus et al.
2003/0048267 A1 3/2003 Allouche

FOREIGN PATENT DOCUMENTS

WO WO 01/75483 A1 10/2001

OTHER PUBLICATIONS

Lötjönen et al., Tracking Atria and Ventricles Simultaneously from Cardiac Short- and Long-Axis MR Images, Spinger link date (Oct. 23, 2003), Springer Berlin / Heidelberg, vol. 2878/2003, pp. 467-474.*

Lötjönen et al.; Tracking Atria and Ventricles Simultaneously from Cardiac Short- and Long-Axis MR Images, Springer link date (Oct. 23, 2003), Springer Berlin / Heidelberg, vol. 2878/2003, pp. 467-474.*

(Continued)

Primary Examiner—Tom Y Lu
Assistant Examiner—Thomas A Conway
(74) Attorney, Agent, or Firm—Venable LLP; Eric J. Franklin (57) ABSTRACT A method for processing slice images wherein information indicative of at least one quantitative measure is formed from image sets. The image sets are acquired from at least two imaging directions. At least two of the image sets relating to the imaging directions are used for forming the information. A method for reducing misalignments, a module, a system and a computer program product for implementing the method.

28 Claims, 6 Drawing Sheets

OTHER PUBLICATIONS

Lötjönen et al. (Tracking Atria and Ventricles Simultaneously from Cardiac Short- and Long-Axis MR Images, Springer link date (Oct. 23, 2003), Springer Berlin / Heidelberg, vol. 2878/2003, pp. 467-474).*

Tim McInerney and Demetri Terzopoulos; Deformable models in medical image analysis: a survey; Medical Image Analaysis; 1996; vol. 1, No. 2; pp. 91-108; Oxford University Press.

Kang-Ping Lin and Te-Shing Chen; An Image Deformation Technique for Myocardial Motion Estimation; IEEE; 1996; pp. 1196-1197.

John Moore et al; A High Resolution Dynamic Heart Model Based on Averaged MRI Data; MICCAI; 2003; LNCS 2878; pp. 549-555.

J. Lötjönen, et al., "Statistical shape model of atria, ventricles and epicardium from short- and long-axis MR images," *Medical Image Analysis*, vol. 8, pp. 371-386 (2004).

Amir A. Amini et al; "Tag Surface Reconstruction and Tracking of Myocardial Beads from SPAMM-MRI with Parametric B-Spline Surfaces"; IEEE Transactions on Medical Imaging, vol. 20, No. 2; Feb. 2001; pp. 94-103.

Raghavendra Chandrashekara et al; "Analysis of myocardial motion in tagged MR images using nonrigid image registration"; Medical Imaging 2002, Milan Sonka et al. editors; 4 pages.

A. Ardeshir Goshtasby et al.; "Fusion of Short-Axis and Long-Axis Cardiac MR Images"; Computerized Medical Imaging and Graphics, vol. 20, No. 2, 1996; pp. 77-87.

B.P.F. Lelieveldt et al.; Multi-view Active Appearance Models for Consistent Segmentation of Multiple Standard views: Application to Long and Short-axis Cardiac MR Images; CARS 2003, Computer Assisted Radiology and Surgery. Proceedings of the 17th International Congress and Exhibition, Jun. 2003; 6 pages.

Ken Museth et al.; "Level Set Segmentation From Multiple Non-Uniform vol. Datasets"; 2002 IEEE Visualization; pp. 179186.

Robert Rohling et al.; "Three-dimensional spatial compounding of ultrasound images"; Medical Image Analysis (1996/7), vol. 1, No. 3; pp. 177-193.

Xujiong Ye et al.; "3-D Freehand Ultrasound Left Ventricle Reconstruction from Multiple Acoustic Windows"; Medical Image Understanding and Analysis Jul. 16-17, 2001; 4 pages.

Xujiong Ye et al. ; "3-D Freehand Echocardiography for Automatic Left Ventricle Reconstruction and Analysis Based on Multiple Acoustic Windows"; IEEE Transactions on Medical Imaging, vol. 21, No. 9, Sep. 2002; pp. 1051-1058.

* cited by examiner

METHOD FOR PROCESSING SLICE IMAGES

CROSS-REFERENCE TO RELATED APPLICATIONS

This application claims priority to Finnish patent application 20035205 filed 12 Nov. 2003 and is the national phase under 35 U.S.C. §371 of PCT/FI2004/050164.

FIELD OF THE INVENTION

This invention relates generally to a image processing and particularly to such an image processing where image sets are acquired from at least two different directions.

BACKGROUND OF THE INVENTION

Since cardiovascular disease is the most common cause of death in the Western countries, there is a strong need to diagnose and to quantify cardiac diseases early enough. The cardiac imaging techniques have improved considerably during the last years providing nowadays detailed anatomic and functional information on the heart. In addition, the automated analysis of the cardiac images has also been intensively developed.

Segmentation of cardiac images is a prerequisite for obtaining many cardiac indices, such as left ventricular volume and ejection fraction. Several approaches have been proposed for the automated segmentation of the ventricles and/or myocardium from magnetic resonance (MR) images. Cine datasets contain images normally from 10-30 cardiac phases and produce therefore detailed information on the cardiac function during the cycle. Tagged MR images provide a golden standard for the cardiac motion analysis, as the tags visible in the images are tracked. However, the analysis of cardiac function in clinical practice is still often based on standard MR images and visual inspection. Although segmentation tools developed for cardiac segmentation could basically be applied to each time instant separately, the techniques based on deformable models provide a natural framework for tracking the motion and changes in chamber volumes within the cine datasets.

MR imaging generates a stack of slice images from user defined locations. The typical pixel size of an MR slice is about 1 mm×1 mm. However, the pixel in the MR image is three-dimensional, i.e. each slice, as well as pixel, has also thickness indicating the region from which it is acquired. In other words, the gray-value of each pixel is an average from all tissues inside a box, such as 1 mm×1 mm×5 mm if the slice thickness is 5 mm. Due to signal-to-noise ratio, the slice thickness is typically higher than the pixel size. The problem in increasing the slice thickness is that the images become smoother and small spatial details are lost.

Typically, several MR image series are acquired during one imaging session. If a subject moves during the imaging session, the relation between image series, derived from the image headers, is lost and image registration is needed to realign the images. A subject may move because of several reasons, e.g. coughing, breathing or change of inconvenient pose. Breathing is a major source of movement artifacts in cardiac imaging, as the heart's own movement is handled by the ECG gating. Studies about the movements of the heart due to respiration can be found from related art. When the cine sequences are used to track the cardiac motion, an image series produced during a breath hold contains typically slices from several time points but only from one spatial location. If the phase of the breathing cycle is not similar during all acquisitions, slices from different image series will be misaligned relative to each other, and a volume built from the image series does not represent the real anatomy of the subject.

The tracking of the heart has usually concentrated only on ventricles and/or epicardium using short-axis images. Because the slice thickness is much higher than the pixel size in slice level, the tracking of the basal and apical regions of the ventricles using short-axis images is difficult. In practice, the ventricles are usually simply cutted by a plane at some basal level. Therefore, the use of two or more imaging directions is considered meaningful to improve the accuracy of image analysis One method is disclosed in publication WO 01/75483A1, wherein two MR image stacks, acquired preferably orthogonally, are fused in order to improve the image contrast and resolution. At first, the stacks are registered with each other and a simple registration method based on translation of image stacks by maximizing the correlation between the image gradients is proposed. A high-resolution three dimension volume (image stack with low slice thickness) is produced by fusing the registered stacks. In the publication a back-projection technique is used to create the volume. The objective of the publication is to provide a method for improving the contrast and resolution of the images, and that is done by fusing the stacks and generating one high-resolution data set.

What is needed then is an improved solution for acquiring quantitative information of the heart. Such a solution should take into a account drawbacks of related art, e.g. blurring effect of the images. This invention addresses such a need.

SUMMARY OF THE INVENTION

This invention utilizes information about image slice sets acquired from two or more imaging directions. The method does not depend on orthogonality of the imaging directions. The main feature of the subject-matter is to use image sets substantially separately, but yet simultaneously for extracting quantitative measures from images.

An object of this invention to improve the accuracy of quantitative information extracted from slice images.

Another object of this invention is to provide a segmentation technique by using information about two or more image set acquired from different imaging directions.

Yet another object of this invention is to provide a registration technique for removing movement artifacts from slice images.

These objects of the invention can be achieved by a method and another method, a module, a system and a computer program product for allowing a computation of quantitative information.

The method according to one embodiment is mainly characterized in that at least two said image sets relating to said directions are used substantially separately for forming said information.

The method for reducing misalignment errors between image slices is mainly characterized in that, the misalignment errors are reduced by registering slices of an image set to slices from at least one other image set.

The module is mainly characterized in that, the module is configured to use said image sets relating to said directions substantially separately for forming said information.

The system for processing slice images, wherein said system is capable of forming information indicative of at least one quantitative measure from image sets is mainly characterized by the above-described module. The system includes displaying means for presenting the quantitative measures. And the computer program product is mainly characterized by computer readable instructions for implementing the method for forming information indicative of at least one quantitative measure from image sets.

This invention provides an improved tool for extracting quantitative information for a region of interest An example of such is a heart. The quantitative information can include information about the geometry of the region of interest as well as functions of the region of interest. When the heart is used as an example of the region of interest, the quantitative information can relate at least to structural or geometrical measures of atria, ventricles, myocardium (such as the volumetry of cardiac cavities) and the function or dynamics of the heart (such as the motion of various cardiac structures).

Simultaneous tracking of short-axis (SA) and long-axis (LA) images broadens the heart image processing. The LA images provide comprehensive information especially on tracking the movement of the basal and apical regions of the ventricles in the heart's long-axis direction.

The image sets that are acquired at least from short-axis and long-axis contribute differently on various regions in the algorithm. For example, the information on the apex of the heart can be extracted from long-axis images as the information on the medial parts of the heart can be retrieved from short-axis images. The simultaneous tracking of two image orientations allows to track more precisely the basal and apical movement of the ventricles. In addition, the motion of the atria can be tracked.

BRIEF DESCRIPTION OF DRAWINGS

An embodiment of the subject-matter is set forth in the drawings, in the detailed description which follows, and in the claims annexed to. Further objects and advantages provided by the solution are also considered in the description.

DETAILED DESCRIPTION OF THE INVENTION

In this example a method is used for cardiac analysis of a subject, where during scanning (i.e. imaging sessions) the subject, a short-axis (SA) and a long-axis (LA) image volumes are acquired using a known imaging protocol adopted for cardiac subjects e.g. magnetic resonance imaging or other imaging system producing slice images of different levels of the region of interest. Image sets in this description refers to such an image sets that are formed of image slices. The set can be, for example, a stack of image slices or a set of sector slices. What is common here, is that the image set comprises image slices that are recorded from different locations of the region of interest. In addition to cardiac applications, the method can be applied to other regions of interests as well as to other application areas, such in applications related to confocal microscopy, where slice-like images are also used.

In this example, SA images contain ventricles from valve level until the level where the apex is still visible, and LA images contain atria and ventricles. In practice, a slight tilt compared to the known LA view can be used in order to get the mitral and tricuspidal valves to the same image slice. The pixel size can be e.g. 1.4×1.4 mm for the SA and LA images. The slice thickness can be 7 mm for the SA images and 7 mm for the LA images. The corresponding values for the slice separation can be then 15 mm and 10 mm. The number of slices may vary from 4 to 8 depending on the size of the heart. From 22 to 30 time points can be taken for each section with a repetition time of 33 msec. The amounts are given for example only and one skilled in the art will appreciate their variations depending on the situation.

Figure 1:
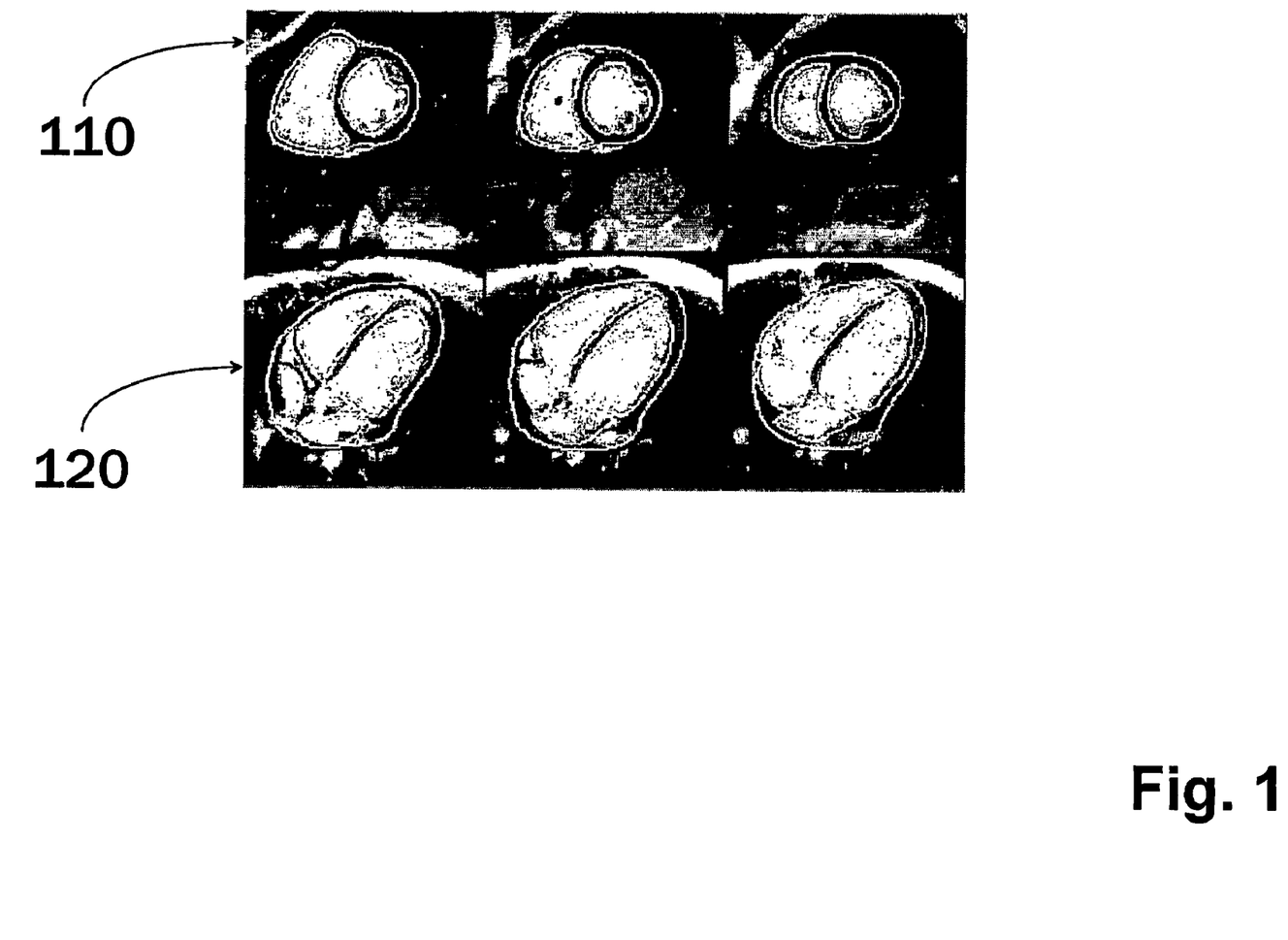
FIG. 1 illustrates an example of a segmentation result (a three dimensional surface) shown on three slices per two directions.

Heart structures (atria, ventricles and epicardium) can be segmented either manually or automatically from the images. Here, a software tool designed for making three dimensional deformations interactively is used. The software tool is utilized for registering manually a triangulated surface model and non-rigidly to edges in the SA and LA volumes. An example of segmentation result is shown in FIG. 1, wherein a triangulated three dimensional model (bright lines in the FIG. 1) has been superimposed on the SA volume 110 and on the LA volume 120. In automatic method, the approach described in the following non-rigid registration section could be used.

The SA and LA volumes are interpolated isotropic using e.g. a shape-based interpolation algorithm before segmentation. Other interpolation methods can be used as well. The interpolation is not, however, a pre-requisite for using information about two or more imaging directions.

Figure 2:
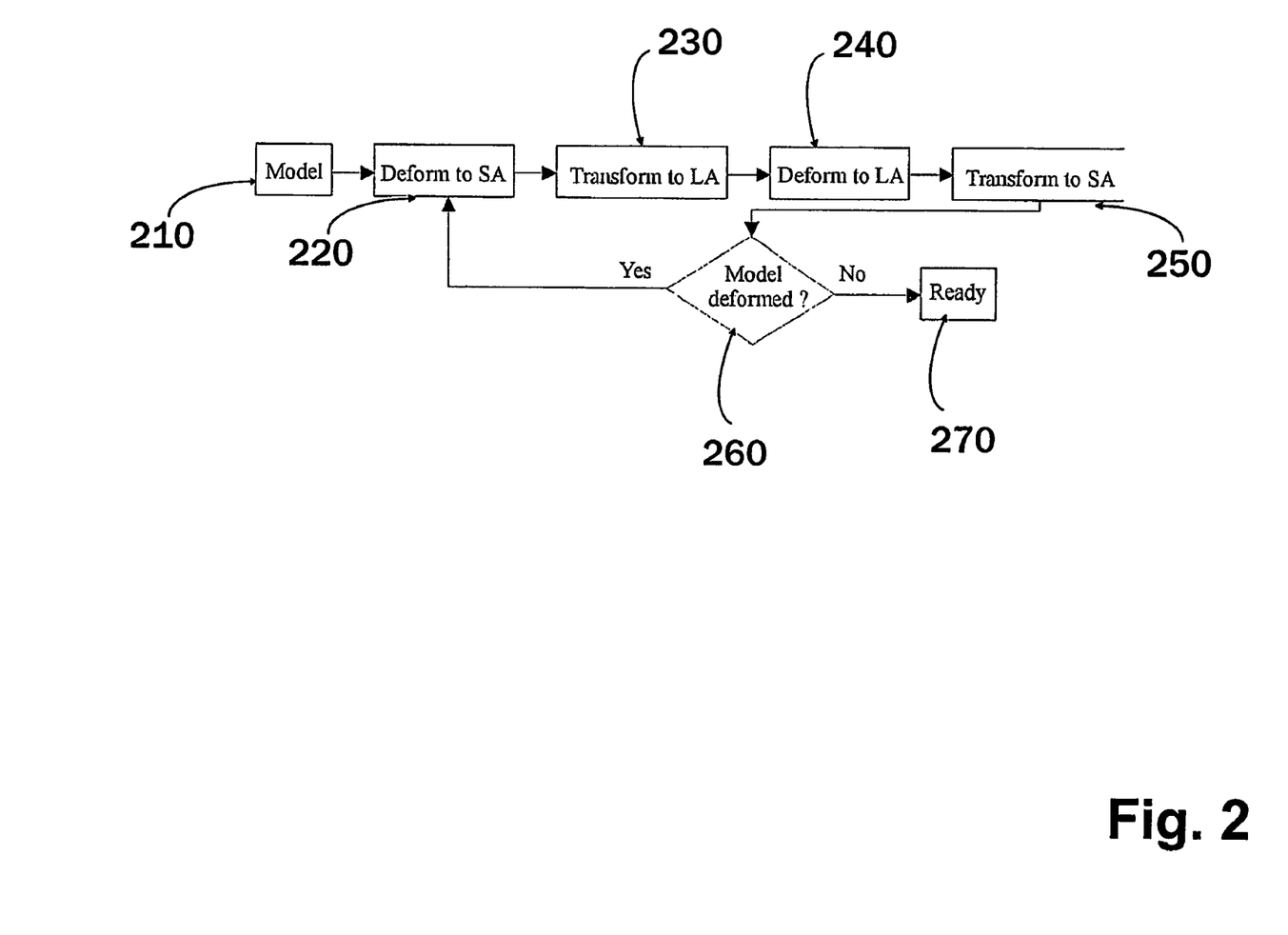
FIG. 2 illustrates an example of a segmentation flowchart.

The deformation procedure for the superimposed model is illustrated in FIG. 2 as a segmentation flow-chart. The procedure is carried out substantially simultaneously, i.e. two or more imaging directions are used to generate the final result. Here, the model 210 is manually deformed 220 to the SA volume. After finishing the deformation 220 in the SA volume, the deformed model is transformed 230 to the co-ordinate system of the corresponding LA volume. The matching is continued in the LA volume by deforming 240 the model in the LA volume and again transforming 250 the model in the SA volume. The deformed model is transferred iteratively 260 between the volumes until no deformations were needed 270. Depending on the implementation of the software tool, the deformation results could be alternatively visualized simultaneously on images from different imaging directions, and no iterations between imaging directions were needed. This approach is used in our automatic volume tracking procedure (see below).

The rigid transformation, f, used to transform the model from the SA volume to the LA volume ($f^{-1}$ is used from LA to SA) is extracted from image file headers which contain the orientation and the position of the slices relative to the subject's anatomy.

Because images usually are obtained at breath hold, differences in the position of the heart between the breath holds are detected. If the differences are not corrected, the transformation derived from the image headers will not produce good results. The differences can be detected and corrected separately in each image volume. Image sets orthogonal to original slice orientation can be generated and the slices can be moved manually, if any abnormal discontinuities were detected in structures. The differences may be detected automatically as well. One example of the automatic detection is described in the following:

Automatic Detection of the Differences

Figure 3:
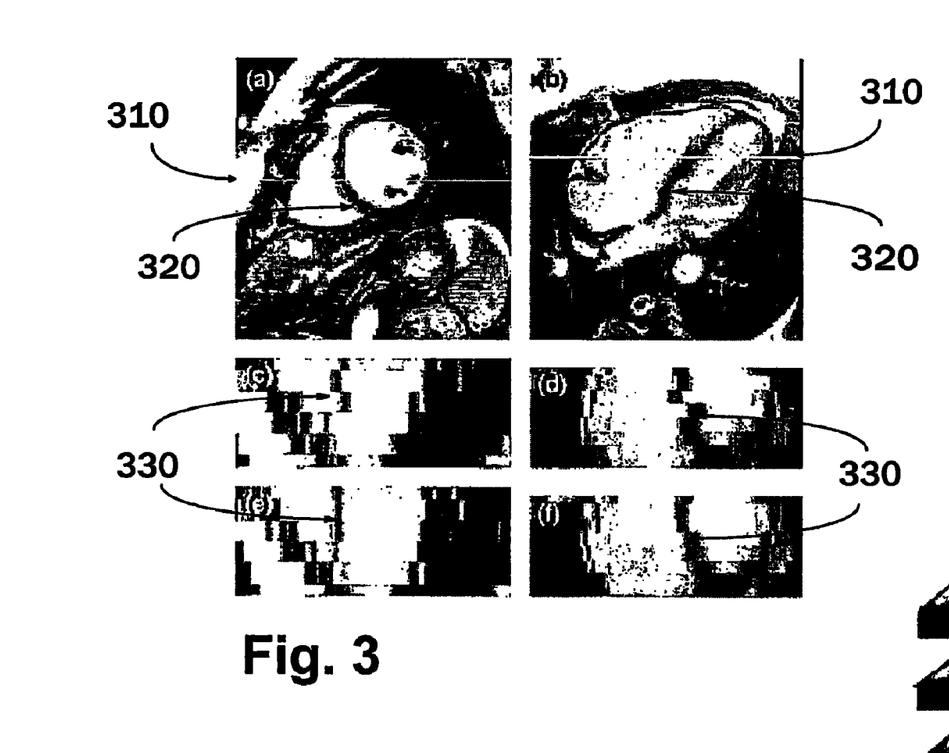
FIG. 3 illustrates an example of a movement correction.

The movement artifacts can be visually observed by forming an image volume from the cine series and computing a cross-section of the volume. In FIG. 3 a movement correction is illustrated. FIG. 3a presents original SA and FIG. 3b original LA slices. The horizontal line 310 (in both figures) represents the location from which cross-sections are computed. FIG. 3c presents the cross-sections of the SA volume and FIG. 3d presents the cross-sections of the LA volumes before movement correction. FIG. 3e presents the cross-sections of the SA volume and FIG. 3f presents the cross-sections of the LA volumes after movement correction. FIGS. 3a, b show one SA and LA slice, respectively, from a subject having severe movement artifacts. The cross-sections are interpolated to isotropic voxel size by using some known interpolation method, e.g. nearest neighbor interpolation, for better visualizing the shifts. The dark region 320 (in FIGS. 3a,b) in the middle of the images represents the septum, which is naturally a smooth and continuous object. In the cross-sections (in FIGS. 3 c,d,e,f), the septum (330) is nor smooth nor even continuous. For example, the shift between slices in FIG. 3c and FIG. 3e in the SA cross-section, i.e. the gap in the septum, corresponds to 13 mm. FIGS. 3e, f show the cross-sections after applying the automatic correction algorithm, which is described next.

The criterion of the smooth and continuous septum could be used to shift the slices in the SA and LA volumes separately. The problem in making the corrections separately is that the comprehensive shape information available in the other volume is not used. In other words, mapping the structures from the SA volume to the LA volume, using only DICOM (Digital Imaging and COmmunications in Medicine) header information, can be inaccurate although the shape of the heart may appear visually realistic in the both volumes separately.

Figure 4:
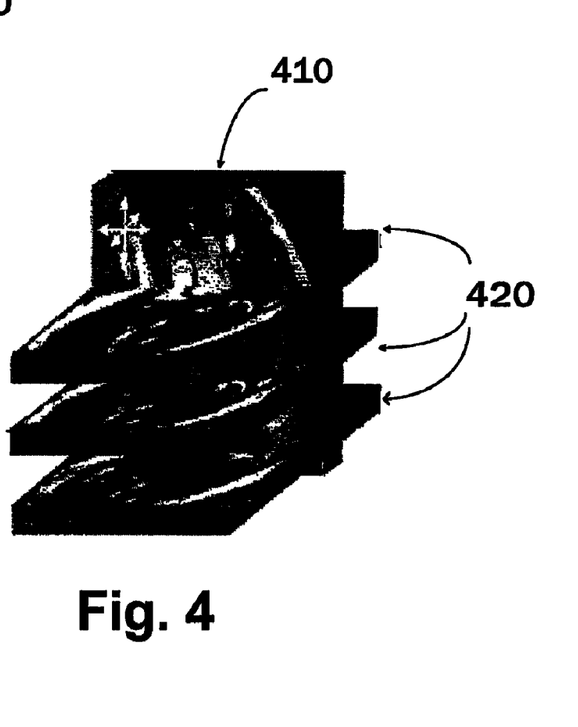
FIG. 4 illustrates an example of an optimization of long-axis slice relative to short-axis volume.

The basic idea of the current automatic registration algorithm is presented in FIG. 4, wherein an optimization of a LA slice (410) relative to SA volume (420) is illustrated. The normalized mutual information (NMI) is maximized between the SA and LA data by:

$$E_{NMI} = \frac{H(SA) + H(LA)}{H(SA, LA)},$$

where H(SA) and H(LA) are marginal entropies and H(SA, LA) a joint entropy of the data. The voxel-by-voxel correspondence is calculated based on image headers (image headers contain information about the location and orientation of each slice relative to the imaging device). The displacement of each slice is assumed to be independent on the displacements of the other slices. One slice is randomly chosen from the SA and LA stacks and it is moved to the direction that maximizes the NMI. The slice locations are iterated until the NMI does not increase.

Although this embodiment is concentrated in building a three dimensional shape model, the acquired images are four dimensional cine images. The fourth dimension in this example contains information about the motion of the heart. Because all time points related to one spatial location are acquired during the same breath-hold, data from all time instants can be used to compute the NMI. In other words, as a slice is displaced, all time points of the slice are displaced. Although the use of several time points is not necessary, its effect to improvement of the registration accuracy is seen.

Figure 5:
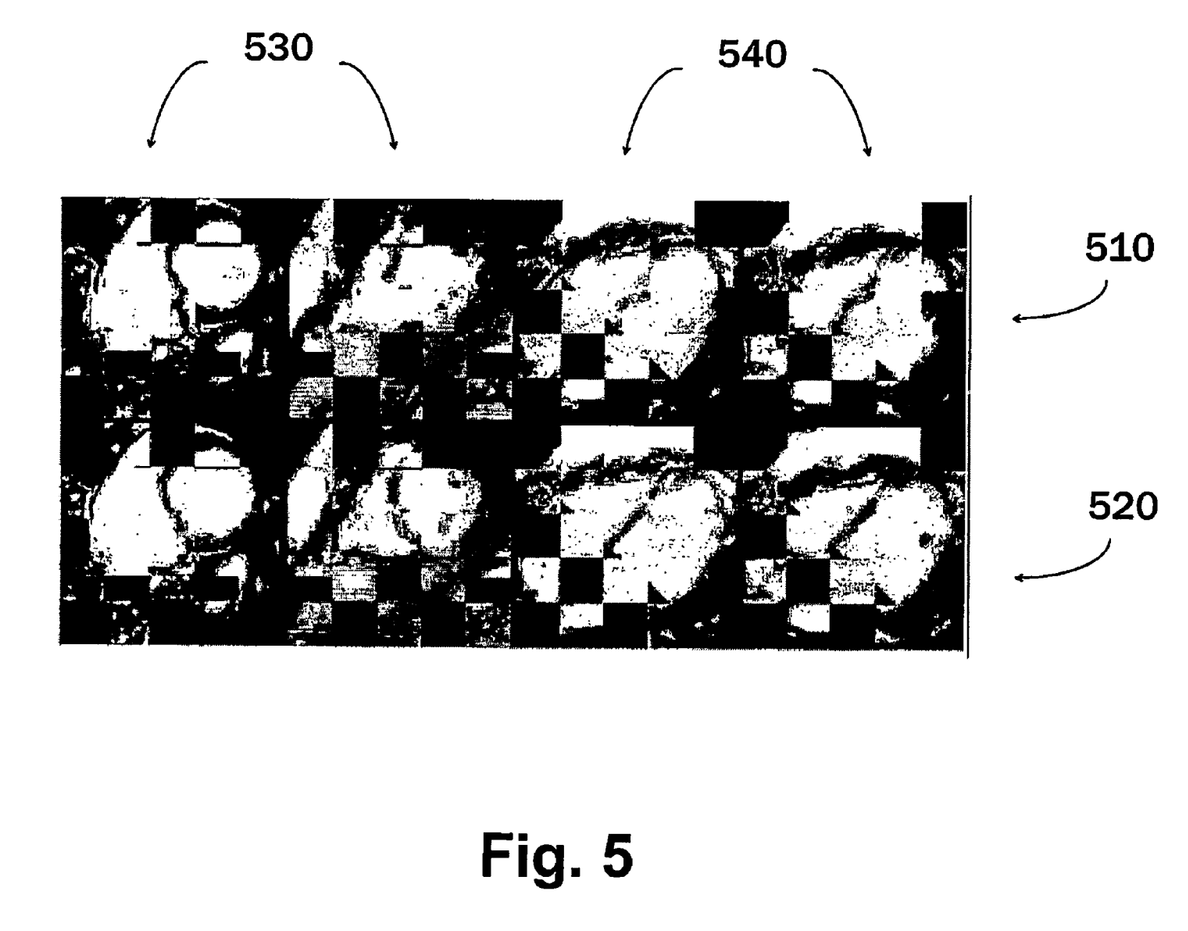
FIG. 5 illustrates an example of a movement correction result.

FIG. 5 shows the SA and LA volumes visualized using a chessboard visualization technique before the motion correction (the top row, 510) and after the motion correction (the bottom row, 520). The first two columns (530) from the left (from the viewer) show the volumes as the LA volume is transformed to the SA co-ordinate system. The third and fourth columns (540, from the left from the viewer) visualize the result as the SA volume is transformed to the co-ordinate system of the LA volume. As can be noticed from the images in FIG. 5, the edges are more continuous across the chess-boxes with the movement correction than without it. The black boxes indicate that no data is available for that location in the volume, e.g. the SA volume does not contain any data from atria.

In practice, the subject can normally keep almost a similar breathing phase between the acquisitions and no clear misalignment can be visually detected from the volumes.

Non-Rigid Registration

SA and LA volumes are registered non-rigidly simultaneously to different time instants. Formally, the source volumes S1(x,y,z) and S2(x,y,z) are registered to destination volumes D1(x,y,z) and D2(x,y,z), respectively. The objective of non-rigid registration is to find an optimal transformation T for aligning the source volumes to the destination volumes. The transformation is determined by maximizing a similarity measure between the volumes.

Normalized mutual information (NMI) is used as a similarity measure between the volumes S and D. The NMI is defined as:

$$I(S, D) = \frac{H(S) + H(D)}{H(S, D)},$$

where H(S) and H(D) are marginal entropies and H(S,D) a joint entropy of the volumes S and D. Here the source data consist of both SA and LA source volumes, S={S1, S2}, and the destination data consist of the SA and LA data of the destination subject, D={D1, D2}.

The computation of the measure is not straightforward during the non-rigid registration, because the orientation and the position of the SA and LA slices are not the same. If the non-rigid transformation T is defined for the SA volume, it should be rigidly registered using the rigid transformation f, in order to get the transformation in the LA co-ordinates. Making this transformation during the non-rigid registration would be very time consuming. Therefore, the LA volume is converted to the SA co-ordinates by the transformation $f^{-1}$ before the non-rigid registration. The operation decreases the quality of the LA images but it was considered acceptable compared to decrease in the computation time.

Figure 6:
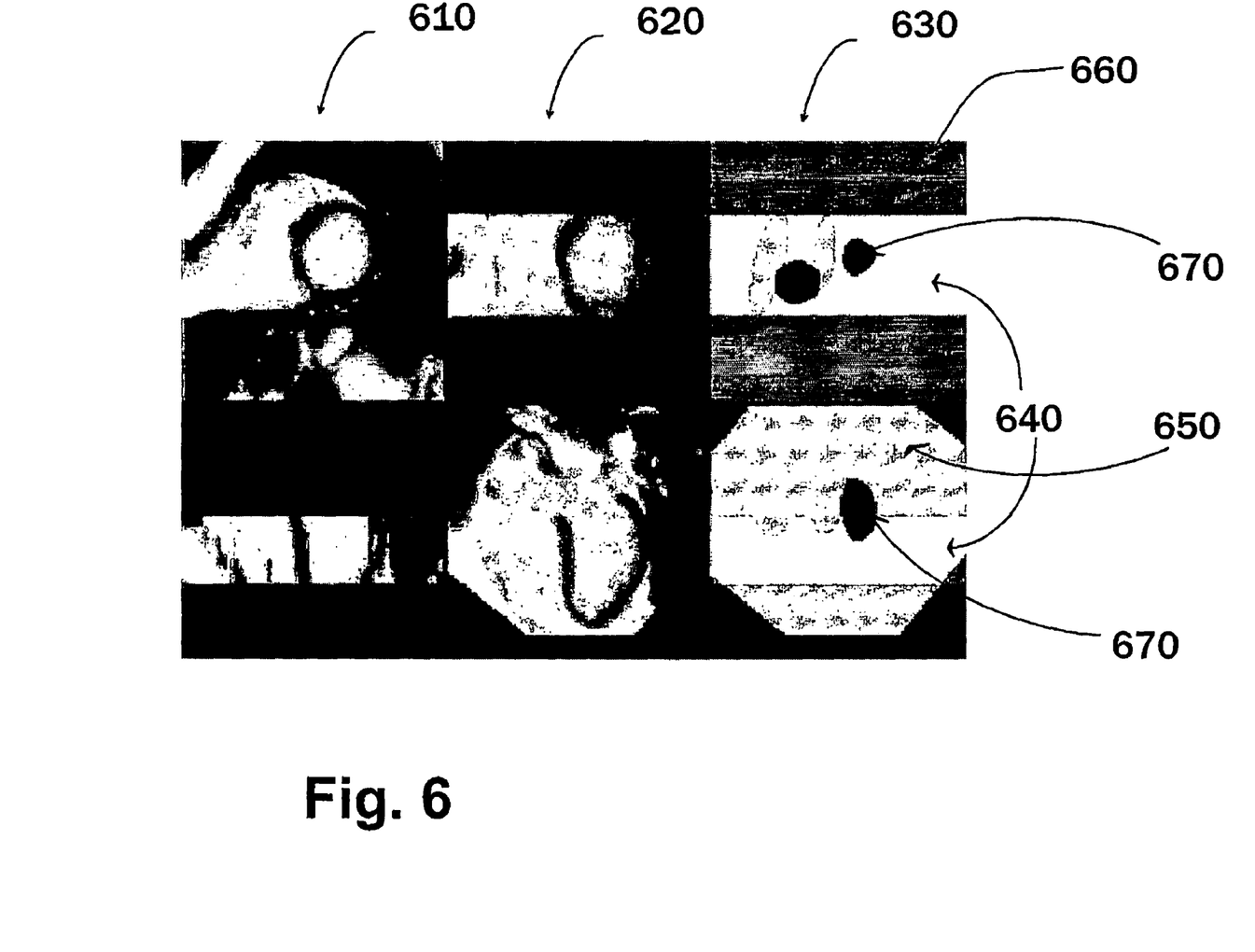
FIG. 6 illustrates an example of two orthogonal slices from short-axis volume and transformed long-axis volume and a mask used in computing normalized mutual information.

After transforming the LA volume to the SA coordinates, all transformed LA voxels may not be inside the SA volume. Therefore, empty (black) slices are added to the SA volume above the basal slice and below the apical slice in order to get all LA voxels inside the SA volume. FIG. 6 represents two orthogonal slices from the SA volume (the left column from the viewer, 610) and from the transformed LA volume (the center column, 620). The right column from the viewer (630) shows the mask used in computing the NMI.

The added empty slices are not included in computing the NMI. Therefore, a mask is used to choose the voxels from the SA and LA volumes for the NMI computation, represented by the right column (630) in FIG. 6. Both SA and LA voxels under the white color (640) are used in computing NMI while only LA voxels are used for the light gray (650) and only SA voxels for dark gray (660). The voxels under the black color (670) are not encountered for the NMI.

The combined similarity measure including the mask and the transformed LA volume is defined as in Equation (2) but with S={S1, S2*} and D={D1, D2*} where the superscript '*' stands for the transformed volume, i.e. the volume one is assumed to be the SA volume and the volume two the LA volume, and the NMI is computed only from the voxels under the mask., where M represents the mask for the volume i.

Volumetric Deformation

The non-rigid registration of volume data can be done by using the deformation sphere approach. In the deformation sphere framework, the transformation is applied only to voxels or data points inside a sphere. The transformation vector u inside the sphere is defined as:

$$u = \frac{e^{-k\frac{(x-c_x)^2+(y-c_y)^2+(z-c_z)^2}{r^2}} - e^{-k}}{1 - e^{ki}} U$$

where k is a user-defined parameter (as example, here 2.0 is used), (cx, cy, cz) is the location of the sphere center, r is the radius of the sphere (as example, here from 30 voxels to 12 voxels) and U is the vector in the center of the sphere. During the deformation, the location and the size of the sphere are varied. The location of the sphere (the center of the sphere) is randomly located to the surfaces of atria, ventricles and epicardium. However, as the transformation is volumetric, the transformation is not only restricted to object boundaries. At each location of the sphere, the optimal transformation vector U is defined, i.e. the vector that maximize the similarity between the volumes. In practice, the vector U is defined as follows:

$$U = \underset{I}{\mathrm{argmax}}\{p + n_p, p, p - n_p\}$$

where I stands for the NMI, p is the location of the sphere's center and np is the normal vector of the surface (atrium, ventricle or epicardium) at location p. A high number of spheres (a few thousands) are sequentially applied to the data during the deformation. The coarse-to-fine approach can be used: the size of the sphere is gradually decreased during the iteration.

Volume Tracking

The volume tracking can be done by matching the volume of time instant t to the volume of time instant t+1. The transformation $T_{0,t}$ from the time instant 0 to the time instant t can be computed from $$T_{0,t} = \sum_{i=0}^{t} T_{i,i+1}$$

FIG. 7a shows the function of the mitral valve (indicated by an arrow, 710) during three consecutive time phases at systolic phase. The detection of the border between the ventricles and the atria is clear when the mitral and tricuspid valves are closed. However, when the valves open, the tracking algorithm should not follow the valves as happens if the deformation is not regulated. It was decided that the border should be on the straight line between the most basal parts of the myocardium (indicated by a line 720 in FIG. 7a). Wherein FIG. 7a illustrates three consecutive time instances during the systolic phase, FIG. 7b illustrates the surfaces used in non-rigid registration.

Two solutions are proposed to cope with the problem of opening valves: modification of the mask and modification of the surfaces of the objects of interest.

Modification of the Mask

Because the opening valves disturb the tracking algorithm, the valves can be masked out from the volume data. In practice, two surfaces are generated to contain both valves at the time phase t=0 (the most diastolic phase). Thereafter, the volumes inside the surfaces can be deleted from the mask (black round regions 670 in FIG. 6). Because the transformation T, defined to the SA and LA volumes, is applied to the surfaces during the deformation, the interaction is needed for the first time phase. As mentioned above, the valves disturb the deformation only while opening. Therefore, the masking of the valves is used only after the systolic time phase. In practice, the masking can be started from the time phase 10 when the valves are still closed.

Because the resolution of the SA images in long-axis direction (orthogonal to the slice) is fairly poor compared to the LA images, the masking out of the basal regions of the myocardium from the SA images can also be applied.

Modification of the Surfaces of the Objects of Interest

As mentioned in the previous section, the deformation spheres are randomly placed only to the surfaces of atria, ventricles and epicardium. Because the tracking of the valves is not desired, parts of the surfaces near the valves are deleted. In practice, the triangulated surfaces are used, and triangles close to valves are removed. FIG. 7b shows the surfaces (bright lines) superimposed on one slice after deleting the triangles from the valve region. Since the transformation is volumetric, the valve region is also transformed but based on the transformations applied in surrounding regions, i.e. the basal regions of the myocardium.

Results

Figures 7, 8A:
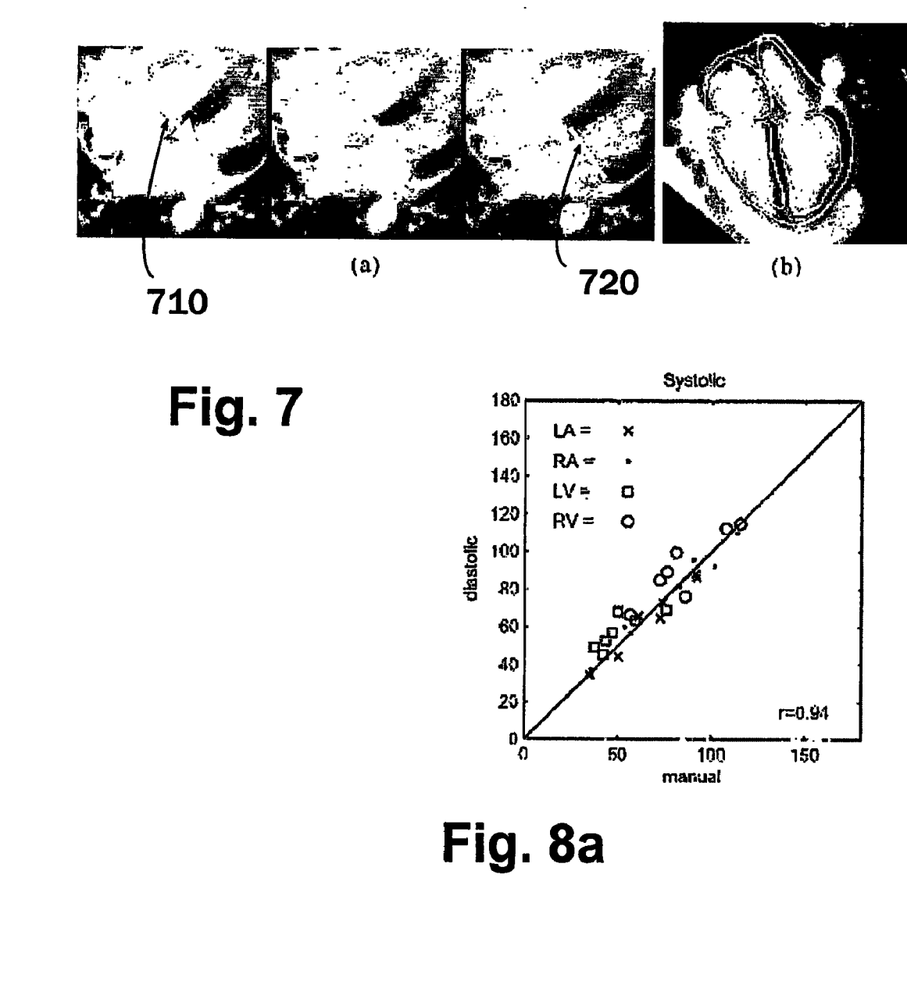
FIG. 7 illustrates an example of three consecutive time instances during systolic phase and the surfaces used in non-rigid registration.
FIG. 8a illustrates an example of volumes at systolic time phase.
Figure 8B:
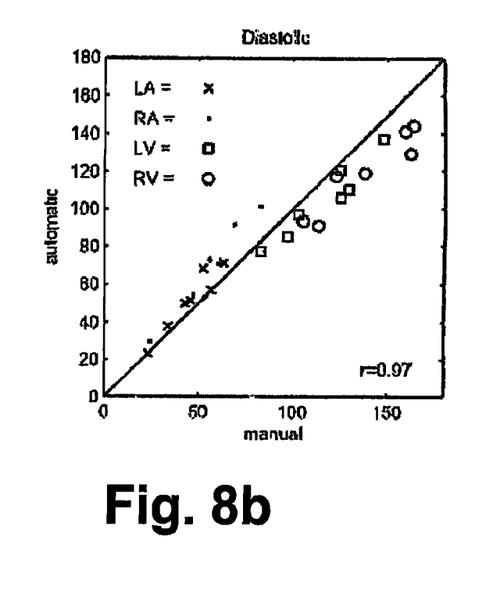
FIG. 8b illustrates an example of volumes at diastolic time phase.

The comparison of volumes between manual and automatic volume tracking is shown in FIG. 8. The results are shown both for the systolic (FIG. 8a) and diastolic (FIG. 8b) phases. The diastolic phase (FIG. 8b) contains cumulative error of all deformations from the diastolic phase (t=0) to diastolic phase (t=22-30). The cumulative error is, however, built up from signed contributions meaning that if, for example, no elasticity is allowed to the model, the error could be zero at the diastolic phase although the error was large in the systolic phase. The correlation coefficients were 0.94 and 0.97 at the systolic and diastolic phases, respectively. The computation time for registering 24 time phases was about two hours (5 minutes/registration) using a standard 2.0 GHz Pentium Workstation.

This application proposes a new approach to volume tracking of atria, ventricles and epicardium. The approach combined information both from standard SA and LA cardiac images. This made possible the tracking of the atria as well as the basal and apical regions of the ventricles. The method disclosed can be applied to acquire other quantitative information as well, such as other information of the volumetry of cardiac cavities or the motion of the heart.

It will be clear that variations and modifications of the examples of embodiment described are possible without departing from the scope of protection of the invention as set forth in the claims.

The invention claimed is:

1. A method for processing slice images, the method comprising:
   using image sets from at least two imaging directions, wherein an image set is a set of slice images in one imaging direction;
   automatically correcting misalignment of a first image slice with respect to a second image slice in a target area, wherein the first image slice and the second image slice belong to the same image set in one imaging direction, and wherein said correcting misalignment is carried out by using data from at least one other image set in at least one other imaging direction;
   defining at least one object of interest from corrected image sets; and
   forming information indicative of at least one quantitative measure of the at least one object of interest.

2. The method according to claim 1, further comprising: segmenting the target area from said image sets.

3. The method according to claim 1, further comprising: utilizing information about at least two imaging directions for computing a quantitative measure.

4. The method according to claim 1, wherein the slice images comprise cardiac image sets acquired from a heart.

5. The method according to claim 4, wherein the cardiac image sets are acquired from short-axis and long-axis of the heart.

6. The method according to claim 1, wherein the misalignments are corrected between different slice images separately on a same phase.

7. The method according to claim 1, wherein said information is used to compute at least one quantitative measure or said information itself is at least one quantitative measure related to at least one of structure, function, gray value or color.

8. The method according to claim 7, wherein the information related to structure comprises at least one of indicators for pose, size or shape.

9. The method according to claim 1, wherein at least one image set contains at least two slice images.

10. The method according to claim 1, wherein said slice images are produced by magnetic resonance imaging, ultrasound imaging or confocal microscope.

11. A method, comprising: selecting a slice image from a first image set in one imaging direction, wherein an image set is a set of slice images in one imaging direction; registering the selected slice image of the first image set to slice images of a second image set in another imaging direction; selecting another slice image from said first image set; registering said other selected slice image from said first image set to slice images of the second image set; and iterating said selecting and registering for slice images of said first image set in order to automatically correct misalignment of slice images of the first image set with respect to other slice images of the first image set.

12. The method according to claim 11, further comprising: optimizing a similarity measure between a slice of said first image set and said second image set by moving said slice of said first image set to optimize said similarity measure.

13. A module for processing slice images, wherein said module is configured
   to use image sets from at least two imaging directions, wherein an image set is a set of slice images in one imaging direction,
   to automatically correct misalignment of a first image slice with respect to a second image slice in a target area, wherein the first image slice and the second image slice belong to the same image set in one imaging direction, and wherein said correcting misalignment is carried out by using image data from at least one other image set in at least one other imaging direction;
   to define at least one object of interest from corrected image sets; and
   to form information indicative of at least one quantitative measure of the at least one object of interest.

14. The module according to claim 13, wherein said module is configured to utilize information about at least two imaging directions for computing a quantitative measure.

15. The module according to claim 13, wherein the region of interest is heart.

16. The module according to claim 15, wherein the cardiac images sets are short-axis image sets and long-axis image sets.

17. The module according to claim 13, wherein the module is configured to determine at least one quantitative measure related to structure, function, gray value or color.

18. The module according to claim 17, wherein the at least one quantitative measure related to structure comprises at least one indicator for pose, size or shape.

19. A system for processing slice images, wherein said system is configured to form information indicative of at least one quantitative measure from image sets, said system comprising:
   imaging means for recording said image sets at least in two directions, wherein an image set is a set of slice images in one imaging direction; and
   a module being configured
      to automatically correct misalignment of a first image slice with respect to a second image slice in a target area, wherein the first image slice and the second image slice belong to the same image set in one imaging direction by using image data from at least one other image set in at least one other imaging direction,
      to define at least one object of interest from corrected image sets, and
      to form information indicative of at least one quantitative measure of the at least one object of interest.

20. The system according to claim 19, wherein said imaging means are means for magnetic resonance imaging, means for ultrasound imaging or means for confocal imaging.

21. A non-transitory computer readable medium having a stored computer program for processing slice images, comprising: computer readable instructions adapted, when run on a computer to cause the computer, to use image sets from at least two imaging directions, wherein an image set is a set of slice images in one imaging direction, to automatically correct misalignment of a first image slice with respect to a second image slice in a target area, wherein the first image slice and the second image slice belong to the same image set in one imaging direction, and wherein said correcting misalignment is carried out by using image data from at least one other image set in at least one other imaging direction, to define at least one object of interest from corrected image sets, and to form information indicative of at least one quantitative measure of the at least one object of interest.

22. The method according to claim 1, further comprising:
correcting misalignment of the slice images of the first image set in one imaging direction by also utilizing image data from the first image set.

23. The module according to claim 13, wherein the module is further configured to correct misalignment of the slice images of the first image set in one imaging direction by also utilizing data from the first image set.

24. The system according to claim 19, wherein the module is further configured to correct misalignment of the slice images of the first image set in one imaging direction by also utilizing data from the first image set.

25. The system according to claim 19, further comprising:
a display configured to present the quantitative measures.

26. The non-transitory computer readable medium according to claim 21, wherein the computer readable instructions are configured to cause the computer to correct misalignment of the slice images of the first image set in one imaging direction by also utilizing image data from the first image set.

27. The method according to claim 1, further comprising:
defining said object of interest by matching a three-dimensional model on the corrected image sets from said at least two imaging directions.

28. The method according to claim 11, further comprising:
selecting a slice image from said second image set;
registering said selected slice image from said second image set to slice images of the first image set; and
iterating randomly said selecting and registering for slice images of said first image set and second image set in order to automatically correct misalignment of slice image with respect to other slice images of the same image set.

* * * * *